United States Patent

[11] 3,628,053

[72] Inventor Leonard Weiss
Poughkeepsie, N.Y.

[21] Appl. No. 886,928
[22] Filed Dec. 22, 1969
[45] Patented Dec. 14, 1971
[73] Assignee International Business Machines Corporation
Armonk, N.Y.

[54] LOGIC SWITCH WITH VARIABLE THRESHOLD CIRCUIT
10 Claims, 7 Drawing Figs.

[52] U.S. Cl. .................................................... 307/203, 307/214, 307/215, 307/218, 307/268
[51] Int. Cl. .................................................... H03k 5/00, H03k 19/12, H03k 19/40
[50] Field of Search ........................................ 307/203, 213, 214, 215, 218, 268; 330/30 D, 32

[56] References Cited

UNITED STATES PATENTS 3,509,363 4/1970 Jen et al. ........................ 307/203

*Primary Examiner*—James W. Lawrence
*Assistant Examiner*—T. N. Grigsby
*Attorneys*—Hanifin and Jancin and Theodore E. Galanthay

ABSTRACT: Disclosed is an improved logic switching circuit in the class of switching circuits in which the output signal changes in response to an input signal traversing a reference potential. Disclosed also is an improved means for varying the reference potential resulting in an overall increase in speed and increased immunity to noise in the transient state. The means for varying the reference potential in its essence includes two transistors in a common emitter-type configuration in which a resistive imbalance is placed in the respective emitter current paths, thereby providing an inverted output from a common emitter-type configuration, and having an AC response which differs from the DC response.

INVENTOR
LEONARD WEISS

BY Theodore E. Galanthay
AGENT

LOGIC SWITCH WITH VARIABLE THRESHOLD CIRCUIT

CROSS REFERENCES TO RELATED APPLICATIONS OR PATENTS

U.S. Pat. No. 2,964,652, inventor H. S. Yourke. U.S. Pat. No. 3,458,719, Inventor Leonard Weiss.

Application Ser. No. 609,074 filed on Jan. 13, 1967, now U.S. Pat. No. 3,509,363 inventors Teh-Sen Jen and Leonard Weiss.

Application Ser. No. 495,826, filed on Oct. 4, 1965, now U.S. Pat. No. 3,500,071 inventor Teh-Sen Jen.

BACKGROUND OF THE INVENTION

1. Field of the Invention

My invention relates generally to logic switching circuits and more specifically to threshold logic switching circuits commonly referred to as "current switches."

2. Description of the Prior Art

The overall performance capability of digital computers and other systems employing switching circuits is largely dependent upon the switching speed of the individual circuits, particularly in view of the enormous number of switching operations which must be performed in any given time period or for any particular computation for data process. Therefore, the art has devoted itself to the development of circuits having the highest possible switching speed.

A circuit widely accepted and extensively used as meeting the criteria of the highest possible switching speed is the so-called "current switch" disclosed in the above referenced U.S. Patent to H. S. Yourke. In its essence, a current switch is a logic circuit switchable in response to an input potential traversing a reference potential. A significant breakthrough in the operation of current switches was realized by the inventor of the present application as disclosed in the above referenced U.S. Pat. No. 3,458,719. In that patent, it was disclosed that the speed of the current switch could be increased by applying a variable reference potential rather than a mere steady-state voltage as had been done previously. An alternate means for varying the reference potential to a current switch is disclosed in the above-referenced application Ser. Nos. 495,826 and 609,074.

With the advent of ever-increasing microminiaturization, resulting in packaging densities exceeding 400 circuits per square inch, the relative area occupied by a given circuit and the short transmission lines interconnecting the various circuits become important factors additional to the ever-present desirability of obtaining maximum overall speed. In order to limit the area occupied by a circuit, it is desirable to eliminate capacitors as well as limit the number and size of active components and resistors. It is further desirable to limit the capacitance of a circuit in the signal path. The extremely short transmission lines between circuits cause troublesome reflections which were heretofore tolerable thereby establishing a need for circuits with a greater certainty of switching time by having an increased immunity to noise in the transient state. All the aforementioned disadvantages result in cumbersome wiring rules which severely limit the number of circuits which can be electrically connected to, and desirably positioned with respect to, a given circuit node.

A desirable feature of such densely integrated high-speed circuits is normally accomplished by taking the output of a circuit from the emitter of a transistor. In all such emitter-output circuits known in the prior art, however, the output has tended to be in phase with the input to the base of that transistor, by "following" the input, and this has limited the applications in which the advantageous feature of having an output from the emitter of the transistor could be utilized.

SUMMARY OF THE INVENTION

It is therefore an important object of my invention to increase the speed of operation of a threshold logic circuit.

It is also an important object of my invention to obtain an out of phase output from the emitter of a transistor in a common emitter type circuit configuration.

Another object of my invention is to reduce the amount of space occupied by a threshold logic circuit.

A further object of my invention is to reduce the capacitance in the signal path of a switching circuit.

A still further object of my invention is to reduce the noise sensitivity of a threshold logic circuit in its transient state.

In accordance with one aspect of my invention, a common emitter-type circuit is interposed as a feedback path between the out-of-phase output of a current switch and the reference node of the current switch. This interposed circuit limits the amount of capacitance on the output of the current switch to that of the input capacitance of one transistor. This interposed circuit has a hysteresis-type response in that its threshold level for switching differs between the positive-going and negative-going transition. For a more detailed explanation of the operation of such hysteresis-type circuits in general, reference is made to the above-mentioned application Ser. No. 495,826. This interposed circuit is further characterized by the fact that its AC response differs from its DC response. These characteristics of the interposed circuit tend to initially drive the reference potential positive in response to a negative-going input signal to the current switch and conversely, the reference potential is initially driven negative in response to a positive-going signal at the input terminal of the current switch. The phenomenon is similar to that observed in the above-referenced U.S. Pat. No. 3,458,719, particularly at FIG. 28 thereof, without the attendant disadvantages relating thereto. An improved noise immunity in the transient state is obtained without the use of a capacitor, resulting in an even faster circuit which occupies less space.

In accordance with another aspect of my invention, an out-of-phase output is obtained from a common emitter-type circuit configuration. In a preferred embodiment, this common emitter-type circuit consists of two transistors and four resistors. The emitters of the two transistors are connected by two resistors which differ significantly in their values of resistance. A first resistor connected to the emitter of the first transistor has a significantly higher value of resistance than the second resistor connected to the emitter of the second transistor. The base of the second transistor is connected to the collector of the first transistor. The output is taken from a point between the first and second resistor. By way of example, a positive-going input to the base of the first transistor will cause the output to initially go positive and then negative. Similarly, a negative-going signal at the input to the base of the first transistor will cause the output to first follow the input and then go positive. What is then described is a circuit having differing AC and DC characteristics. In the AC mode (transient state), the output tends to follow the input, whereas in the DC mode (steady state), the output is out of phase with the input. This characteristic is obtained whether one uses NPN or PNP-type transistors.

Although for purposes of illustration, my invention is embodied in a transistor current switch, it is readily embodied in any other form of switching circuit which is switched in response to the traversal of input and reference potentials, and irrespective of whether such other form of circuit utilizes transistors or any other type of active component. Moreover, the common emitter-type circuit here disclosed has broad use in many applications as will become readily apparent to those skilled in the art.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
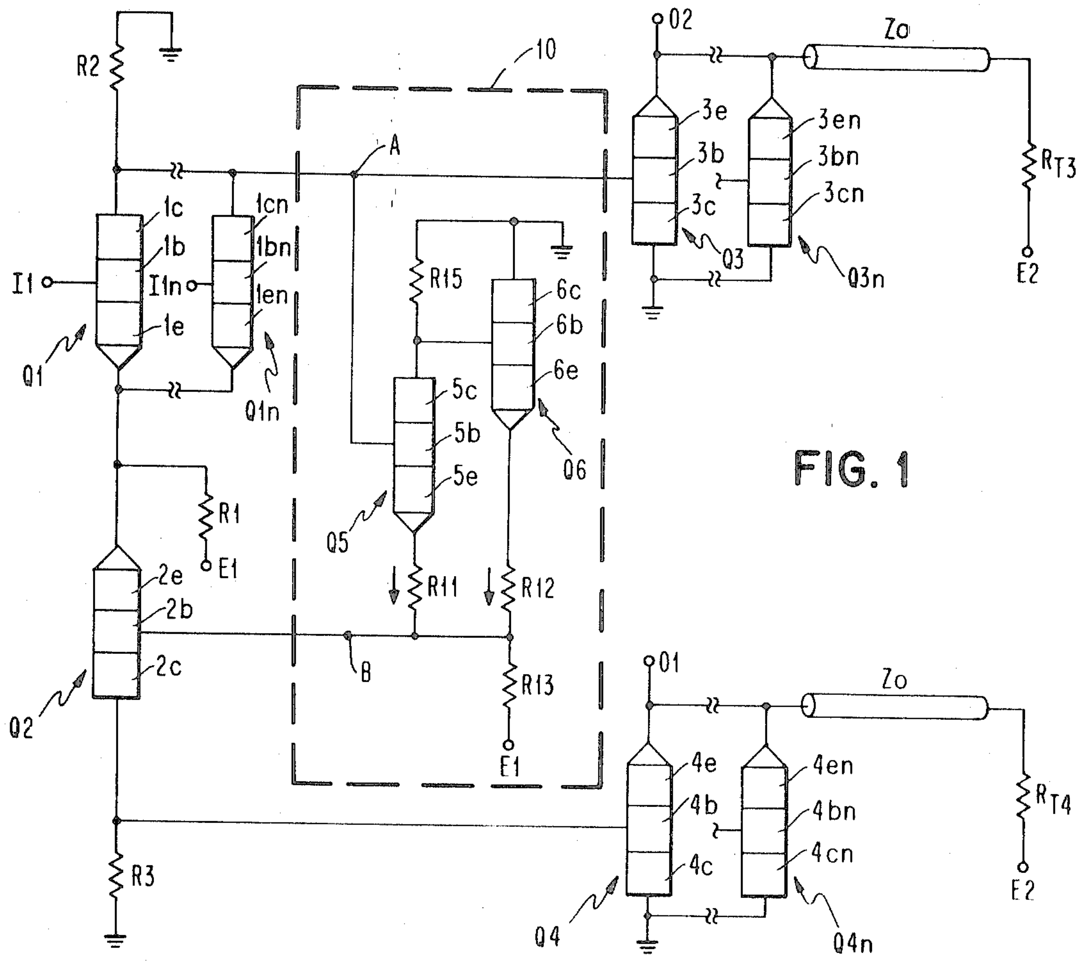
FIG. 1 is an improved logic switching circuit embodied in a current switch emitter-follower circuit.
Figure 2:
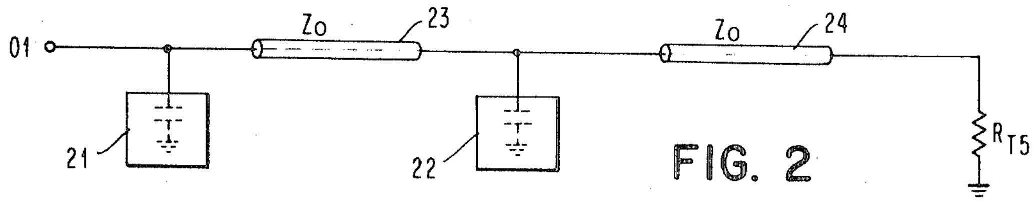
FIG. 2 is a block diagram of a typical equivalent circuit at the output of the circuit of FIG. 1.
Figure 3:
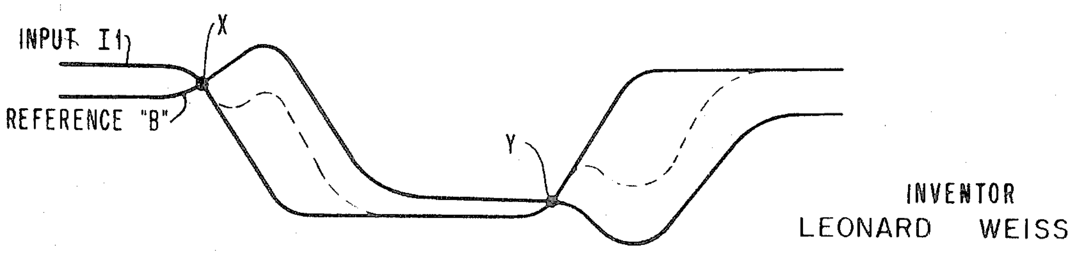
FIG. 3 is a waveform partially depicting the operation of FIGS. 1 and 2.

Refer now to the drawings and particularly to FIGS. 1, 2, and 3. FIG. 1 shows my invention embodied in a current switch emitter follower (CSEF) circuit. The current switch portion of the circuit basically comprises transistors Q1 and Q2. As indicated, any number of transistor Q1*n* can be placed in parallel with transistor Q1 in order to form current switch circuits with transistor Q2. The current switch, in its most basic form, has base 2*b* of transistor Q2 held at a steady potential such as ground. The input potential at input terminal I1 is binary and always has a potential either positive or negative with respect to the reference potential applied at base 2*b* of transistor Q2. As the potential at input terminal I1 is changed from one of its two states to the other, the current switch (e.g. transistors Q1 and Q2) will switch at a point in time where the input potential traverses the reference potential. The foregoing is set forth in greater detail in my above-referenced U.S. Pat. No. 3,458,719. The just-mentioned patent includes a description of a means for improving the speed of the basic current switch by applying a variable reference potential to base 2*b* of transistor Q2. The above-referenced application Ser. No. 609,074 also teaches means for varying the reference potential. The output of the current switch is applied to an output network for connecting the current switch to a load. Generally, the load is various other circuits in the overall network. The output network basically comprises transistors Q3 and Q4 connected in an emitter-follower configuration. The complete circuit is therefore referred to as a current switch emitter-follower (CSEF). The output of the current switch emitter-follower (CSEF) circuit is applied to various other circuits (or loads) in the overall network. As an example, see FIG. 2 showing the in phase output 01 connected to various other circuits 21 and 22 by means of transmission lines 23 and 24 which are terminated to ground by characteristic impedance RT5. Circuits 21 and 22 have been symbolized by dotted lines as capacitive loads. Assuming that the capacitive load of circuit 22 is very large and the length of transmission line 23 is very short, then the reflection back through transmission line 23 will severely effect the input to circuit 21. The effect of this reflected signal is indicated by dotted lines in FIG. 3, as will be explained in greater detail hereinbelow.

With continued reference to FIG. 1, there is disclosed a current switch emitter-follower circuit, having an improved circuit 10 for varying the reference potential of the current switch. The current switch includes any one of transistors Q1 to Q1*n* and transistor Q2. Transistors Q1 and Q2 are joined at their emitters 1*e* and 2*e*, respectively, which is in turn connected to a current source as depicted by resistor R1 and potential source E1. Transistors Q1 and Q2 therefore comprise an active binary element having a reference node B and an input node I1 and being switchable from one state to another in response to the potential of the input node traversing the potential of the reference node. The collectors 1C and 2C of transistors Q1 and Q2, respectively, are the inputs to the base 3*b*, and 4*b* of transistors Q3 and Q4, respectively. Transistors Q3 and Q4 comprise an output network for connecting the current switch to various loads. The collectors 1*c* and 2*c* are also connected to ground through resistors R2 and R3, respectively, Typically, R3 has a slightly higher value of resistance than R2 as explained in greater detail hereinbelow. The collectors 3*c* and 4*c* are also directly connected to ground. Additional transistors in parallel with Q3 and Q4 provide flexibility for various logic functions. The transistors Q3*n* and Q4*n* represent the emitter dot connections from the outputs of other circuits such as the circuit depicted in FIG. 1. The outputs of the circuit are taken from transistors Q3—Q3*n* and Q4–Q4*n*. The in-phase output is taken from the emitter of transistor of Q4, for example, and terminated to voltage E2 through terminating resistor RT4. The out-of-phase output is taken from transistor Q3, for example, and terminated to potential E2 to a terminating resistor RT3. Circuit 10 is an active feedback network extending from node A in the out-of-phase output signal path to the reference node B. As such, circuit 10 is the means for varying the reference potential to base 2*b* of transistor Q2 as will now be described in greater detail.

Figure 4:
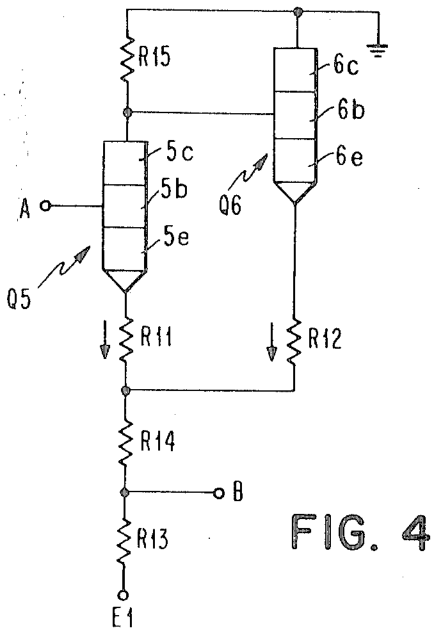
FIG. 4 is a generalized circuit diagram of the means for varying the reference potential.
Figure 5:
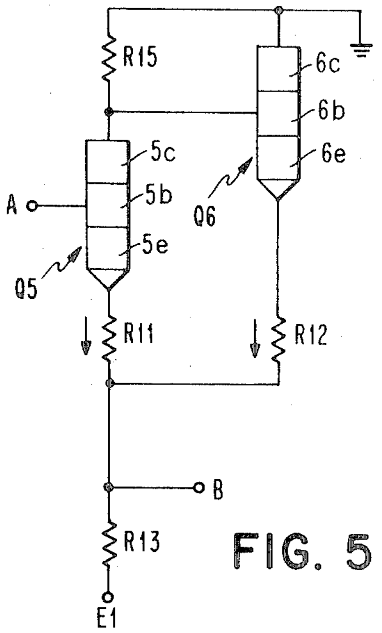
FIG. 5 is a preferred embodiment of the means for varying the reference potential.
Figure 6:
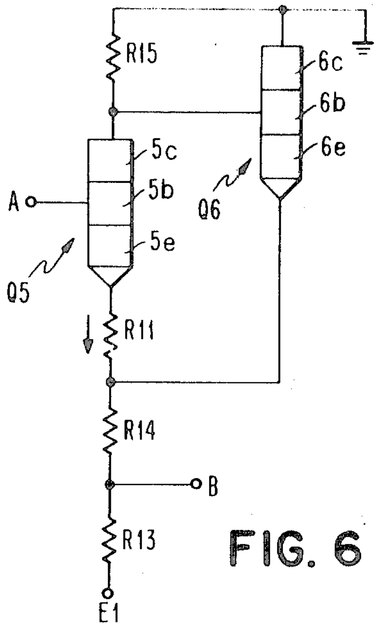
FIG. 6 is an alternate embodiment of the means for varying the reference potential.

Refer to FIGS. 4, 5 and 6 for a description of circuit 10 in FIG. 1. Corresponding components have been labeled with corresponding reference numerals. Circuit 10 includes transistors Q5 and Q6. The collector 5*c* of transistor Q5 being direct coupled to the base 6*b* of transistor Q6. Collector 5*c* is also connected to collector load resistor R15 which is connected to ground. The collector 6*c* is also connected to ground. Emitter 5*e* is connected to resistor R11 and emitter 6*e* is connected to resistor R12. In the FIG. 4 embodiment, both resistors R11 and R12 are connected to resistor R14. Resistor R13 is connected to resistor R14 and is also connected to potential E1. The input to circuit 10 is taken from node A to base 5*b* and the output is taken from a point between resistor R13 and R14 at node B. An important feature of my invention is that resistor R11 is always significantly larger than resistor R12, resulting in various advantages in the operation of the circuit. The embodiment depicted in FIG. 4 is a generalized format for circuit 10. In practice, a preferred embodiment is to remove resistor R14 from the circuit, resulting in a reduced number of components. In the circuit of FIG. 4, it is the purpose of resistor R14 to form a voltage divider with resistor R13. With R14 removed (set equal to zero) from the circuit, the values of the remaining resistors may be adjusted to form the necessary voltage level setting functions. An alternate embodiment is depicted in FIG. 6 in which resistor R12 has been removed (set equal to zero) and resistor R14 has been retained. In this embodiment, the resistor imbalance between resistors R11 and R12 is automatic since R12 is substantially equal to zero.

The advantages of the various circuit structures just described will become apparent in the description of the operation of the circuits. The operation of the circuit of FIG. 1 will first be described with reference to the waveform depicted in FIG. 3. The details of the operation of circuit 10 will then be described with reference to the waveform depicted at FIG. 7. In operation, the active binary elements consisting of any one of transistors Q1 to Q1*n* and transistor Q2 operate as a current switch and are switchable from one state to another in response to the input signal at input node I1 traversing the reference potential at node B. Resistor R1 connected to potential source E1 acts as a current source and this constant current will either pass through one of transistors Q1 to Q1*n* or through transistor Q2, depending on the input potential at input terminal I1. If the potential at input terminal I1 exceeds the potential at node B, transistor Q1 will conduct and transistor Q2 will be off. If the input potential at input terminal I1 is at a lower potential than node B, then transistor Q1 is off and transistor Q2 will conduct.

The output at node 02 is out of phase with the input at I1. That is to say, when the input at I1 is at a potential lower than the reference voltage at node B, the input in that condition being described as being at a "down" level, transistor Q1 of "off" causing node A to be near ground potential which is considered an "up" level. Such an "up" level at base 3*b* of transistor Q3 will cause transistor Q3 to conduct placing the output at terminal 02 near ground potential which as just mentioned is considered to be an "up" level. Conversely, when the input at terminal I1 is at a potential greater than the reference potential at node B, meaning that the input is at an "up" level, then transistor Q1 will conduct. When transistor Q1 (or any one of transistors Q1*n*) conduct, node A will be at a potential less than ground level causing transistor Q3 to be "off," thereby causing the output at 02 to be at a "down" level. Those skilled in the art will readily observe that the same analysis for transistors Q2 and Q4 will result in a signal at output terminal 01 which is always in phase with the input signal at terminal I1. In order to achieve the aforementioned mode of operation, both potential sources E1 and E2 are maintained at a negative potential with respect to ground. The foregoing describes the operation of the circuit of FIG. 1 in the steady state. The function of circuit 10 is to provide a variable reference potential at node B to base 2*b* of transistor Q2, and its operation will be considered later. In order to assist those skilled in the art, in constructing an operative circuit in accordance with my invention, nominal component values are provided in the following table 1. These in no way are limitations since skilled circuit designers could vary the given values significantly with equivalent structure while performing my claimed function in accordance with the disclosed teachings.

TABLE 1

| |
|---|
| E1=—volts |
| E2=—volts |
| R1=244 ohms |
| R2=130 ohms |
| R3=178 ohms |
| RT3=50 ohms |
| RT4=50 ohms |
| R11=300 ohms |
| R12=75 ohms |
| R13=600 ohms |
| R15=360 ohms |

With the foregoing values, a nominal "up" level at terminal I1 is −950 millivolts and a nominal "down" level at input terminal I1 is −1,625 millivolts. The corresponding "up" and "-down" levels at reference node B are −1,175 millivolts and −1,400 millivolts. Note that collector load resistors R2 and R3 have different values. The purpose of this design is that transistor Q2 conducts less current than transistor Q1. For example, transistor Q1 conducts when the voltage at base 1*b* is at −950 millivolts, whereas transistor Q2 conducts when the base 2*b* is at −1,400 millivolts. Since the emitters 1*e* and 2*e* of transistor Q1 and Q2 are connected to a constant current source, the potential difference between the base and the emitter is much greater for transistor Q1. Therefore, to maintain a proper voltage level input to transistors Q3 and Q4, resistor R3 is made larger than resistor R2. As pointed out hereinabove, the purpose of the additional transistors which are indicated to be in parallel with transistor Q1, transistor Q3 and transistor Q4, respectively, are for purposes of enhancing the complexity of the potentially obtainable logic functions and do not effect the basic operation of the circuit.

As previously mentioned, it is the function of circuit 10 to provide a variable reference potential at node B. Therefore, the input to circuit 10 is at node A and the output is taken at node B. In the steady state, the output is out of phase with the input, even though it is taken from the emitter circuit of transistors Q5 and Q6. Accordingly, the circuit achieves emitter inversion in a common emitter-type circuit configuration. In the transient state, the properties of the circuit are different from the steady state. That is, transiently the output follows (is in phase with) the input while it is out of phase in the steady state. This, of course, is true for both positive and negative-going transitions. With continued reference to FIG. 5, the steady-state DC operation of the circuit is described. Transistors Q5 and Q6 tend to act as a current switch in the sense that only one or the other conducts at any given time. Each side when conducting, however, carries a different amount of current. The "up" or "on" level to the bases 5*b* and 6*b* of transistors Q5 and Q6, respectively, is the same (i.e. ground). Thus, when transistor Q5 is conducting, the emitter current passing through resistor R11 in the direction indicated by the arrow is equal to:

$$(E1-Veb5)/(R11+R13)$$

For the case when transistor Q6 is conducting, the emitter current through resistor R12 in the direction indicated by the arrow is equal to:

$$(E1-Veb6)/(R12+R13)$$

For a first order approximation, the difference between the emitter to base voltage (V*eb*) of transistors Q5 and Q6 can be neglected. The important feature of my invention of establishing a resistive imbalance between resistors R11 and R12 causing R11 to have a much greater value of resistance will now become apparent. As indicated in the table 1 above, a four to one ratio of the resistance of resistor R11 to resistor R12 is a suitable design ratio. More current will therefore pass through resistor R12 when transistor Q6 is "on" than through resistor R11 when transistor Q5 is "on." It is further to be noted that the output voltage at node B is substantially equal to the algebraic sum of potential E1 and the product of the resistance value of R13 times the current passing through it. Due to the common connection of resistors R11, R12 and R13, the current through resistor R13 is substantially equal to the current through resistor R11 when transistor Q5 is conducting. Conversely, the current through resistor R13 is equal to the current through resistor R12 when transistor Q6 is conducting. Thus, when the input at node A is at an "up" level so that transistor Q5 is conducting, then the output at node B is more negative than when the input at node A is at a "down" level with transistor Q6 conducting. In this manner, steady-state inversion of the input signal has been accomplished in the emitter network of a common emitter configuration current switch-type circuit. The foregoing describes the steady-state, DC operation of circuit 10.

In the transient (AC) operation of circuit 10, the particular advantages become even more apparent. The characteristics of the circuit 10 since it has positive feedback, are such that it exhibits hysteresis, i.e. the collector voltage at collector 5C does not change until the input to the base 5*b* has traversed more than half of its signal swing for each transition. Therefore, there is a period of time in the transition region when the collector current in the "on" or conducting transistor does not change appreciably. As an example, considering the case when the transistor Q5 is conducting, the voltage at its collector 5C is at a sufficiently negative potential so as to maintain transistor Q6 "off." Accordingly, as the input at base 5*b* swings negative, the output voltage at node B will also start decreasing so that transistor Q5 acts as an emitter follower. Due to the hysteresis, there is an apparent time delay at the base 6*b* of transistor Q6 when the voltage at base 6*b* does not change sufficiently for transistor Q6 to start conducting emitter current. Therefore, initially, the output voltage at node B follows the input signal at node A. Alternatively, for the case where transistor Q6 is conducting, the input at node A is initially at its "down" level and transistor Q5 is "off." As the input voltage starts going positive, transistor Q5 starts turning on, adding its emitter current to that already flowing through resistor R13 from transistor Q6, thereby making the output voltage at node B more positive. Due to the hysteresis, again the base voltage at base 6*b* of transistor Q6 does not initially change appreciably so as to alter the emitter current of transistor Q6. For this reason, until the regenerative action of the positive feedback starts to influence the circuit, the output at node B will follow the input at node A during the positive-going transition as well as the negative-going transition.

Figure 7:
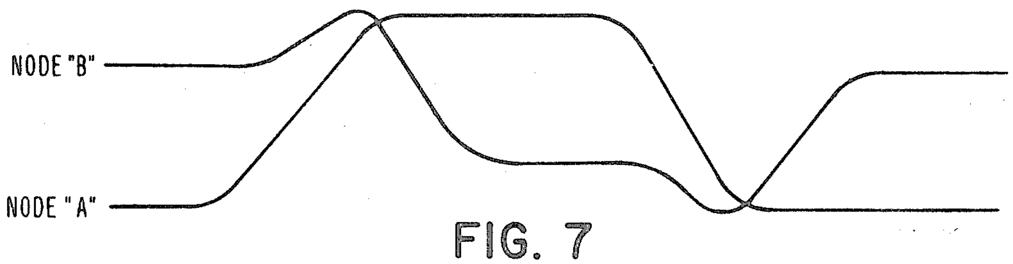
FIG. 7 is a waveform partially depicting the operation of the circuits of FIGS. 4, 5 and 6.

Refer now to FIG. 7 for a summary of the operation of the circuits of FIGS. 4, 5, and 6. The input at node A is the out-of-phase output of the current switch and is typically a binary signal having a "down" level and an "up" level. It is seen that the output signal at node B initially "follows" the input signal at node A before going in a direction opposite to that of the input pulse for providing an out-of-phase steady-state output.

The waveform illustrates that this phenomenon occurs both for positivengoing and negative-going input signals at node A. The imbalanced resistances of resistors R11 and R12 permit the common emitter-type circuit configuration of transistors Q5 and Q6 to provide a steady-state out-of-phase output at node B in response to an input at node A.

Refer now to FIG. 6 for an alternate embodiment. The operation of the circuit of FIG. 6 is quite similar to that of FIG. 5. Comparing FIGS. 4, 5 and 6, it is noted that in FIG. 6 the resistor R12 has been emitted from the circuit of FIG. 4. Therefore, the remaining resistors R11, R13, R14 and R15 must provide the needed functions. Since R12 has been eliminated, the required resistive imbalance is automatically included by the use of resistor R11. Note that the resistive imbalance between the emitter current paths of transistors Q5 and Q6 are greatly in excess of the four to one ratio previously described for FIG. 5. But for all practical respects, the circuit of FIG. 6 preserves all the qualities described for the circuit of FIG. 5 and operates in a similar manner. For an "up" level input at node A, transistor Q5 conducts, but the output at node B is at its "down" level state due to the resistor R1 limiting the emitter current in the emitter circuit of transistor Q5. For a "down" level input at node A, which turns resistor Q5 off and causes transistor Q6 to conduct, a higher value of current will flow in the emitter network causing the output at node B to be in its "up" state. Thus, signal inversion through the emitter of a circuit is again accomplished in the steady state. The circuit of FIG. 6 as the circuit of FIG. 5 has hysteresis in the collector node of transistor Q5, thereby allowing the emitter output at node B to track the input for a predetermined time before switching occurs. Therefore, the wave shapes illustrated in FIG. 7 are again realized. In the circuit of FIG. 6, the resistor R13 is used for level shifting purposes, i.e. an output having identical properties other than voltage levels may also be taken from the emitter *6e* of transistor Q6.

The advantages of the circuit of FIGS. 4, 5 and 6 become apparent when referring back to FIGS. 1, 2 and 3. FIG. 3 is a waveform illustrating the input waveform at terminal I1 and the reference waveform at node B. The solid input waveform is a typical binary signal normally anticipated at the input terminal I1. With increased packaging densities resulting in short transmission lines between circuits and the connection of a large number of capacitive loads to a single node, it has been found that reflections caused the input signal to assume a waveshape similar to that depicted in dotted lines. It was therefore necessary to obtain a reference waveform as shown in FIG. 3 which would move in a direction away from the input waveform so that the input waveform would traverse the reference waveform at only one point in any one transition. Thus, it can be seen that a negative-going waveform at terminal I1 traverses the reference waveform at point $x$ and only point $x$, whereas a positive-going waveform at terminal I1 traverses the reference waveform at point $y$ and only point $y$. This feature gives the circuit increased immunity to noise in the transient state and increases the certainty of switching time. In other words, were the reference potential maintained in a substantially horizontal straight line, the exact point(s) of intersection between the input waveform and reference waveform would be difficult to determine. For a worst case circuit design, a much slower network would be realized. Additionally, it is possible that the input potential traverses a "-horizontal" reference potential more than once (due to reflections) before the input reaches a steady state. This could cause a false (undesired) change of state or an indeterminant output in the circuit of FIG. 1. Furthermore, not only is the reference waveform maintained at a potential close to that of the input waveform in the steady state, but also as soon as the input waveform begins to switch, the reference waveform moves in a direction tending to increase the switching speed even further. It is important that this additional advantage is realized with a circuit (circuit 10) which provides minimal capacitance to the output signal at node A. If a capacitive circuit was inserted at node A, the advantageous feature of having the reference signal move in a direction to intersect the input waveform and thereby provide faster switching action would be at least partially offset by the capacitive circuit attached at node A in the out-of-phase output signal path. Of course, a circuit incorporating a capacitor would also occupy much more space in an integrated circuit. In summary, what is then described is an improved logic switching circuit having an improved means for varying the reference potential resulting in an overall increase in speed and increased immunity to noise in the transient state. Furthermore, the means for varying the reference potential is a hysteresis-type circuit and has transient (AC) characteristics different from its steady-state (DC) characteristics, and an inverted output from a pair of transistors in a common emitter-type configuration is provided.

The specific embodiment shown in the drawings and described above are merely illustrative of several of the many forms which my invention may take in practice and numerous modifications thereof will readily occur to those skilled in the art without departing from the scope of the invention as delineated in the appended claims which are to be construed as broadly as permitted by the prior art.

I claim:

1. A switching circuit with an active binary element having a reference node and an input node and switchable from one state to another in response to the potential of the input node traversing the potential of the reference node, and an output network for connecting said binary element to a load, the improvement comprising:

- means having an output connected to said reference node to vary the potential of the latter in time-delayed phase with any variation of the potential of the input node;
- said means including at least two transistors, the output of said means being taken from a common point in the emitter circuit of said transistors.

2. A circuit as in claim 1 wherein said output network comprises an emitter-follower circuit.

3. A circuit as in claim 1 wherein said means being an active feedback network.

4. A switching circuit as in claim 1 wherein said means further comprises:

- at least two resistors each having one end connected to a common point, the other end of each resistor connected to an emitter of each of the two transistors;
- the resistance value of said resistors being unequal.

5. A switching circuit as in claim 1 further comprising at least one resistor connected between emitters of each of the said transistors.

6. A common emitter-type circuit having an input and an output and actuable from one state to another in response to the potential of the input traversing a reference potential, said circuit comprising:

- a pair of transistors connected in a common emitter-type configuration;
- an input node being conductively connected to the base region of the first of the said pair of transistors;
- a first resistor in the emitter circuit of the first of the said pair of transistors and a second resistor in the emitter circuit of the second of the said pair of transistors, said first resistor having a value of resistance greater than that of the said second resistor, the output being at a common point between the said two resistors; and
- a conductive connection between the base of said second transistor and the collector region of said first transistor.

7. A circuit as in claim 6 wherein said second resistor having a resistance value less than that of said first resistor is replaced by a conductor.

8. A switching circuit including an active binary element having a reference node and an input node and switchable from one state to another in response to the potential of the input node traversing the potential of the reference node, and active means for varying the potential at the reference node, the improvement wherein said active means comprises:

- a first transistor having an emitter, base, and collector, an out-ofsphase output of said active binary element being conductively connected to the base of said first transistor;
- a second transistor having a collector, base and emitter, the base of said second transistor being conductively connected to the collector of said first transistor;
- a first resistor connected to the emitter of said first transistor;
- a second resistor connected to the emitter of said second transistor and also connected to said first resistor, forming a common point, the value of resistance of said first resistor being greater than the value of resistance of said second resistor;
- a third resistor connected to said common point and a first potential source;
- a fourth resistor connected between the collector of said first transistor and the collector of said second transistor, the collector of said second transistor being also connected to a second potential source.

9. A switching circuit including an active binary element having a reference node and an input node and switchable from one state to another in response to the potential of the input node traversing the potential of the reference node, and active means for varying the potential at the reference node, the improvement wherein said active means comprises:

- a first transistor having an emitter, base, and collector, an out of phase output of said binary element being conductively connected to the base of said first transistor;
- a second transistor having an emitter, base and collector, the base of said second transistor being conductively connected to the collector of said first transistor;
- a first resistor connected to the emitter of said first transistor;
- a second resistor connected to the emitter of said second transistor and also connected to said first resistor, forming a common point, the value of resistance of said first resistor being greater than the value of resistance of said second resistor;
- a third resistor connected to said common point;
- a fourth resistor connected to said third resistor and also connected to a first potential source, the output of said active means being taken from a point between said third and fourth resistors;
- a fifth resistor connected between the collector of said first transistor and the collector of said second transistor, the collector of said second transistor being also connected to a second potential source.

10. A switching circuit including an active binary element having a reference node and an input node and switchable from one state to another in response to the potential of the input node traversing the potential of the reference node, and active means for varying the potential at the reference node, the improvement wherein said active means comprises:

- a first transistor having an emitter, base, and collector, an out-of-phase output of said active binary element being conductively connected to the base of said first transistor;
- a second transistor having a collector, base, and emitter, the base of said second transistor being conductively connected to the collector of said first transistor;
- a first resistor connected between the emitter of said first transistor and the emitter of said second transistor;
- a second resistor connected to a point between the emitter of said second transistor and said first resistor;
- a third resistor connected to said second resistor and a first potential source, the output of said active means being taken from a point between said second and third resistors,
- a fourth resistor connected between the collector of said first transistor and the collector of said second transistor, the collector of said second transistor being also connected to a second potential source.

* * * * *